United States Patent
Knight et al.

(10) Patent No.: US 11,626,788 B1
(45) Date of Patent: Apr. 11, 2023

(54) MAGNETIC CYCLOIDAL GEAR ASSEMBLY INCLUDING MOUNTING ARRANGEMENT AND ADJUSTABLE COUNTERWEIGHT

(71) Applicant: Kaney Aerospace, Inc., Rockford, IL (US)

(72) Inventors: Donald Fredrick Knight, Davis, IL (US); Erik Michael Plugge, Rockford, IL (US)

(73) Assignee: Kaney Aerospace, Inc., Rockford, IL (US)

( * ) Notice: Subject to any disclaimer, the term of this patent is extended or adjusted under 35 U.S.C. 154(b) by 52 days.

(21) Appl. No.: 17/487,898

(22) Filed: Sep. 28, 2021

(51) Int. Cl.
*H02K 49/10* (2006.01)

(52) U.S. Cl.
CPC .................................. *H02K 49/102* (2013.01)

(58) Field of Classification Search
CPC ...... H02K 49/00; H02K 49/10; H02K 49/102; H02K 49/106; H02K 7/00; H02K 7/11; H02K 7/116; H02K 7/18; H02K 7/1823; H02K 16/00; H02K 16/02; H02K 16/04; F04C 15/00; F04C 15/006; F04C 15/06
See application file for complete search history.

(56) References Cited

U.S. PATENT DOCUMENTS

| | | | |
|---|---|---|---|
| 7,973,441 B2 | 7/2011 | Atallah | |
| 10,784,762 B1 | 9/2020 | Grundmann et al. | |
| 2004/0232702 A1* | 11/2004 | He | H02K 7/1815 290/31 |
| 2011/0037333 A1* | 2/2011 | Atallah | H02K 51/00 310/98 |
| 2012/0223606 A1* | 9/2012 | Storaasli | H02K 51/00 310/103 |

FOREIGN PATENT DOCUMENTS

WO    2017/058228    4/2017

\* cited by examiner

*Primary Examiner* — Tran N Nguyen
(74) *Attorney, Agent, or Firm* — Amundsen Davis, LLC

(57) ABSTRACT

Magnetic cycloidal gear assemblies and mounting arrangements for magnetic cycloidal gear assemblies are provided that include a fixed stator and a cycloid that rotates eccentrically within the stator. The cycloid can be mounted to an offset cam on the input shaft by a rolling element bearing. A plurality of cam followers connect the cycloid to the output hub. Various features can be provided to increase operational balance or stability. For example, an adjustable counterweight can be attached to the input shaft. Also for example, a mounting arrangement including an adjustable nut, one or more bearings, and/or one or more wave springs can be provided to allow for the application, balancing, or adjustment of axial forces within the assembly.

20 Claims, 10 Drawing Sheets

MAGNETIC CYCLOIDAL GEAR ASSEMBLY INCLUDING MOUNTING ARRANGEMENT AND ADJUSTABLE COUNTERWEIGHT

STATEMENT REGARDING FEDERALLY SPONSORED RESEARCH OR DEVELOPMENT

This invention was made with government support under Contract No. FA8649-21-P-0208 awarded by the United States Air Force AFRL/SBRK. The government has certain rights in the invention.

FIELD OF THE INVENTION

The present invention relates to magnetic gear assemblies, and particularly to magnetic cycloidal gearboxes or gear assemblies, as well as mounting arrangements and balancing structures or components for such assemblies.

BACKGROUND OF THE INVENTION

Gear assemblies are used in a wide variety of applications in order to transmit speed and torque from rotating power sources to other devices. Often, a gear assembly operates to communicate, for receipt by another device, output speed and output torque that are different from input speed and input torque that are received from a rotating power source. Various mechanical and magnetic gear assemblies are known. One type of known magnetic gear assembly is the magnetic cycloidal gear assembly.

The general principle of a magnetic cycloidal gear assembly can be understood to involve two circular structures of unequal size, with the larger circular structure being stationary, and with the smaller circular structure being positioned within the interior of the larger circular structure and arranged to be tangent (or substantially tangent) to an interior circular edge of the larger circular structure. Given such an arrangement, the smaller circular structure can be configured to rotate within the inside of the larger circular structure, along the interior circular edge, in an eccentric manner. Such rotational motion can be exploited for gearing when the outer, larger circular structure is a stator and the inner, smaller circular structure is a rotor.

Figure 1:
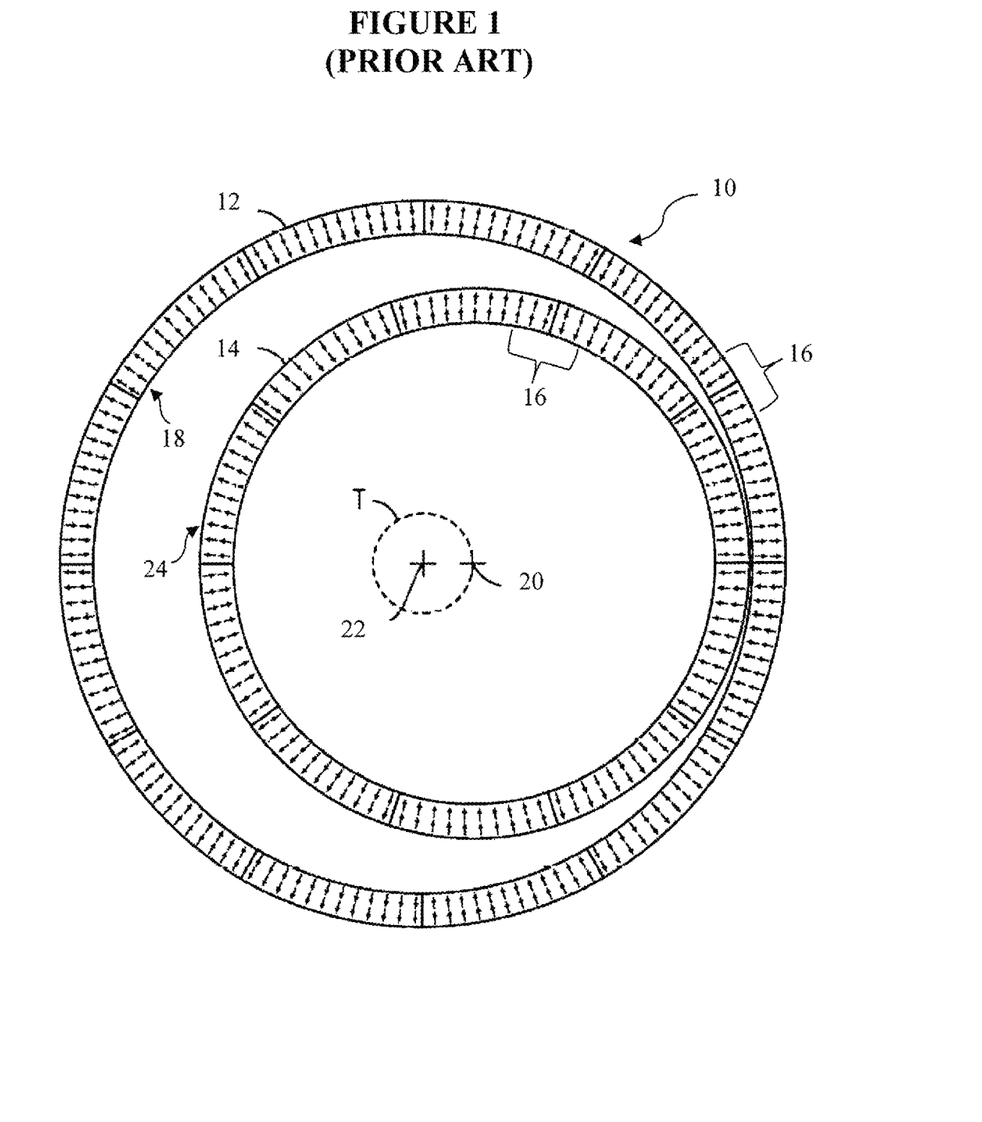
FIG. 1 is a Prior Art schematic, front elevation view of a conventional magnetic cycloid gear as can be employed in a conventional magnetic cycloidal gear assembly.

More particularly, FIG. 1 is a schematic, front elevation view of a conventional magnetic cycloid gear 10, having a stator 12 and a rotor 14. The stator 12 and rotor 14 are positioned in an eccentric (or non-concentric) manner, such that a rotor axis 20 is displaced with respect to and not aligned with a stator axis 22. An input drive shaft (not shown) that drives the rotor 14 has a central axis that is aligned with the stator axis 22, such that the rotor axis 20 also is displaced with respect to the central axis of the input drive shaft. Although the rotor axis 20 is displaced from the central axis of the input drive shaft, the input drive shaft nevertheless is engaged with the rotor 14 in a manner (e.g., by way of a cam) such that rotation of the input drive shaft causes corresponding rotation of the rotor axis 20 about the stator axis 22, such that the rotor axis 20 follows a trajectory 22 (shown in the dashed lines).

Although rotation of the input drive shaft causes rotation of the rotor axis 20 about the stator axis 22 that occurs at the same rotational frequency as the rotation of the input drive shaft itself, this is not to say that the entire rotor 14 rotates at that rotational frequency. Rather, magnetic pole pairs 16 are arrayed on the stator 12 and rotor 14, and magnetic interactions between those of the magnetic pole pairs of the stator 12 and rotor 14 that are closest together depending upon the relative positioning of the stator and rotor at any given time prevent relative "slipping" motion between the stator and rotor. Consequently, as governed by the interaction of the magnetic pole pairs 16, rotation of the input drive shaft causes an outer circular edge 24 of the rotor 14 to "roll along" an inner circular edge 18 of the stator 12 (with those edges only being separated by an air gap), in an eccentric manner determined by the rotation of the rotor axis 20 about the stator axis 22.

The amount of rotation that is experienced by the rotor 14 relative to the stator 12 (as the outer circular edge 24 of the rotor rolls along the inner circular edge 18 of the stator) is determined by the difference in the number of pole pairs arranged along the inner circular edge of the stator relative to the number of pole pairs arranged along the outer circular edge of the rotor. In general, because the stator 12 has more pole pairs along the inner circular edge 18 than the rotor 14 has along the outer circular edge 24, the rotor 14 will rotate more than a full revolution for every revolution it travels around the stator 12. The gear ratio is based on the number of pole pairs arrayed on the stator as compared to the number of pole pairs arrayed on the rotor. For example, if the stator has m+1 pole pairs, and the rotor has m pole pairs, then the gear ratio between the two is −1/m. In the embodiment of FIG. 1, the gear ratio also effectively corresponds to the difference in the circumferences between the inner circular edge 18 and the outer circular edge 24 because magnets of the same size are employed on each of the stator 12 and the rotor 14. However, this is not fundamental and, in other embodiments (e.g., embodiments in which the magnets employed on the stator are sized differently than the magnets employed on the rotor), the gear ratio need not correspond particularly to the difference in the circumferences between the inner circular edge of the stator and the outer circular edge of the rotor.

In a magnetic cycloidal gear assembly, the rotor 14 is mounted on (or is formed by) a cycloidal disk. Although not shown in FIG. 1, it should be appreciated that the cycloidal disk, in addition to being mounted eccentrically on the input shaft as described above, is also typically coupled to an output structure. The output structure serves to output rotational power from the magnetic cycloidal gear assembly. The output rotational torque and speed provided by the output structure typically differ respectively from the input rotational torque and speed (received via the input shaft) in accordance with the gear ratio established by the pole pairs 16 of the rotor 14 and the stator 12.

Notwithstanding the existence of conventional magnetic cycloidal gear assemblies, such conventional magnetic cycloidal gear assemblies face certain challenges and concerns. Although balance and stability are critical to the functionality of magnetic cycloidal gear assemblies, conventional magnetic cycloidal gear assemblies often lack sufficient balance and stability. More particularly, one of the challenges encountered in conventional magnetic cycloidal gear assemblies is that the cycloidal disk, which is mounted eccentrically on the input shaft (sometimes on a single bearing), can be subject to large forces from the magnets and can need to transmit large forces to the output structure. Conventional magnetic cycloidal gear assemblies are often not able to support such large forces in a stable manner. Rather, the cycloidal disk can experience wobble such that the rotor axis 20 becomes misaligned (not parallel) relative to the stator axis 22, which can be detrimental to operation of the gear assembly.

Additionally, the eccentric positioning of the cycloidal disk corresponding to the offset of the rotor axis 20 relative to the stator axis 22 naturally creates an imbalance during operation of a magnetic cycloidal gear assembly employing the rotor 14 and stator 12. If left unbalanced, operation of the magnetic cycloidal assembly can produce extreme vibrations at any speed due to the large eccentric cycloid mass. Although it is theoretically possible to perfectly balance such a system such that dynamics are perfectly cancelled out, in practice, the tolerances and variations between parts still make it difficult to achieve an adequately (much lest perfectly) balanced system.

For at least one or more of these reasons, or one or more other reasons, it would be advantageous if new or improved magnetic cycloidal gear assemblies could be developed so as to address any one or more of the concerns discussed above or to address one or more other concerns or provide one or more benefits.

SUMMARY

In at least one example embodiment, the present disclosure relates to a magnetic cycloidal gear assembly. The assembly includes a stator that is fixed and concentric with respect to a primary axis of the magnetic cycloidal gear assembly, where the stator has a first number of magnetic pole pairs, and an input shaft that is configured to rotate about the primary axis and that includes an offset cam that is offset with respect to the primary axis. The assembly additionally includes a cycloid mounted at least indirectly upon the offset cam and configured to rotate both relative to the offset cam and also within the stator, where the cycloid is eccentric with respect to the primary axis, and where the cycloid includes a second number of magnetic pole pairs and a plurality of cam follower retainers. The assembly further includes an output hub that is concentric with the primary axis and includes a plurality of cam follower receivers, and a plurality of cam followers, each cam follower having a respective first end and a respective second end, where the respective first end of each cam follower is received within a respective one of the cam follower receivers and the respective second end of each cam follower is retained by a respective one of the cam follower retainers. Additionally, the assembly includes an adjustable counterweight attached to the input shaft.

In at least another example embodiment, the present disclosure relates to a magnetic cycloidal gear assembly. The assembly includes a stator that is fixed and concentric with respect to a primary axis of the magnetic cycloidal gear assembly, where the stator has a first number of magnetic pole pairs. Also, the assembly includes an input shaft that is configured to rotate about the primary axis and that includes an offset cam that is offset with respect to the primary axis, and a rolling element bearing on the offset cam. Further, the assembly includes a cycloid mounted on the rolling element bearing and configured to rotate both relative to the offset cam and also within the stator, where the cycloid is eccentric with respect to the primary axis, and where the cycloid includes a second number of magnetic pole pairs and a plurality of cam follower retainers. Additionally, the assembly includes an output hub that is concentric with the primary axis and includes a plurality of cam follower receivers, and a plurality of cam followers, each cam follower having a respective first end and a respective second end, where the respective first end of each cam follower is received within a respective one of the cam follower receivers and the respective second end of each cam follower is retained by a respective one of the cam follower retainers. Further, the assembly includes a mounting arrangement. The mounting arrangement includes a first bearing provided along the input shaft, by which the input shaft can be at least partly supported, and a second bearing provided along the output hub, by which the output hub can be at least partly supported. The mounting arrangement also includes an adjustable threaded nut that at least indirectly applies a first force, in a first axial direction parallel to the primary axis, upon the cycloid. Either the first bearing or at least one additional structure at least indirectly applies a second force, in a second axial direction parallel to the primary axis but opposed to the first force, so as to balance the first force and increase an operational stability of the magnetic cycloidal gear assembly.

In at least another example embodiment, the present disclosure relates to a magnetic cycloidal gear assembly. The assembly includes a stator having an inner cylindrical surface concentric about a first axis, and a plurality of first permanent magnets arranged along the inner cylindrical surface. Also, the assembly includes a cycloid having an outer cylindrical surface concentric about a second axis of the cycloid, and a plurality of second permanent magnets arranged along the outer cylindrical surface. Additionally, the assembly includes an input shaft including an offset cam, where the cycloid is supported at least indirectly by the offset cam so that input rotation of the input shaft causes the second axis to rotate about the first axis and additionally, at least in part due to interactions between the first permanent magnets and the second permanent magnets, causes the outer cylindrical surface to rotate relative to the inner cylindrical surface. Further, the assembly includes an output hub at least indirectly coupled to the cycloid by way of a plurality of cam followers, where the respective cam followers extend from the cycloid into respective cam follower receivers formed in the output hub, so that the output hub is caused to rotate when the outer cylindrical surface rotates relative to the inner cylindrical surface. Also, the assembly includes a mounting arrangement including a plurality of bearings and an adjustable force application component, where the bearings are configured to provide support for the input shaft and the output hub. Further, the assembly includes an adjustable counterweight configured to be mounted on the input shaft. Additionally, the adjustable force application component and at least one of the bearings are configured to apply to the cycloid, at least indirectly, first and second forces parallel to the first axis but in opposed directions. Due to the mounting arrangement and the adjustable counterweight, enhanced balance and stability of operation of the magnetic cycloidal gear assembly are achieved.

Notwithstanding the above examples, the present invention is intended to encompass a variety of other embodiments including for example other embodiments as are described in further detail below as well as other embodiments that are within the scope of the claims set forth herein.

BRIEF DESCRIPTION OF THE DRAWINGS

Embodiments of the disclosure are disclosed with reference to the accompanying drawings and are for illustrative purposes only. The disclosure is not limited in its application to the details of assembly or arrangements of components, or orderings of process steps, illustrated in the drawings. The disclosure is capable of other embodiments or of being practiced or carried out in other various manners. In the drawings, like parts are labeled with like reference numbers. In the drawings.

DETAILED DESCRIPTION

The present inventors have recognized the above challenges and concerns associated with conventional magnetic cycloidal gear assemblies. The present inventors have further recognized that magnetic cycloid gear assemblies having enhanced capabilities can be achieved by employing, as portions of those gear assemblies, improved mounting arrangements and/or balancing components. Magnetic cycloidal gear assemblies or systems of the present technology, by including one or both of improved mounting arrangements or balancing components, can provide enhanced balance and stability, and can be able to support increased forces as compared to conventional magnetic cycloidal gear assemblies.

Magnetic cycloidal gear assemblies as disclosed or encompassed herein can be used in a wide variety of applications. Depending upon the embodiment or application, such magnetic cycloidal gear assemblies can include one or both of mounting arrangements and/or balancing components as disclosed or encompassed herein. For example, in some embodiments, such magnetic cycloidal gear assemblies can be incorporated into servo actuators. In at least one example, servo actuators including such magnetic cycloidal gear assemblies of the present technology can be used for flight surface control applications. Further, magnetic cycloid gear assemblies of the present technology can be made with various gear ratios, and can have various rotations per minute, depending upon the application or desired level of power output.

Figure 2:
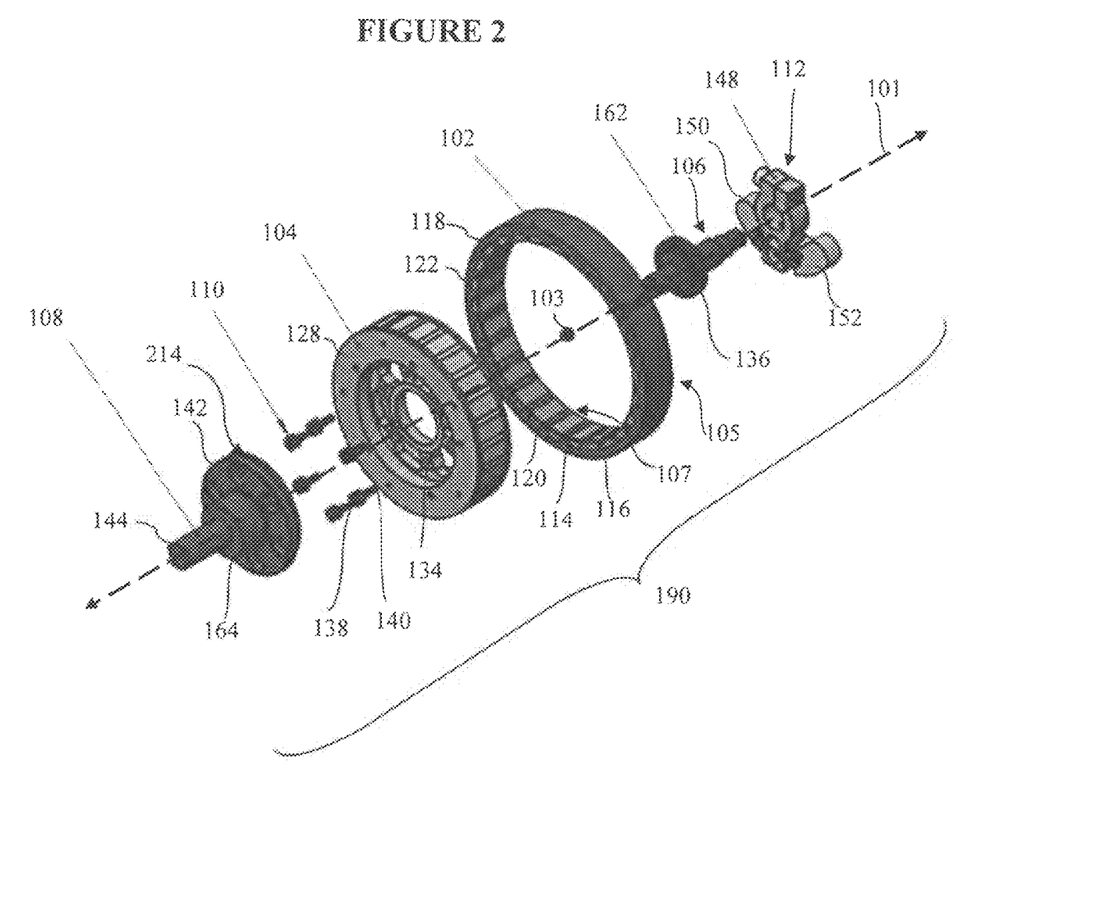
FIG. 2 is an exploded view of portions of one example of a magnetic cycloidal gear assembly of the present technology.
Figure 3:
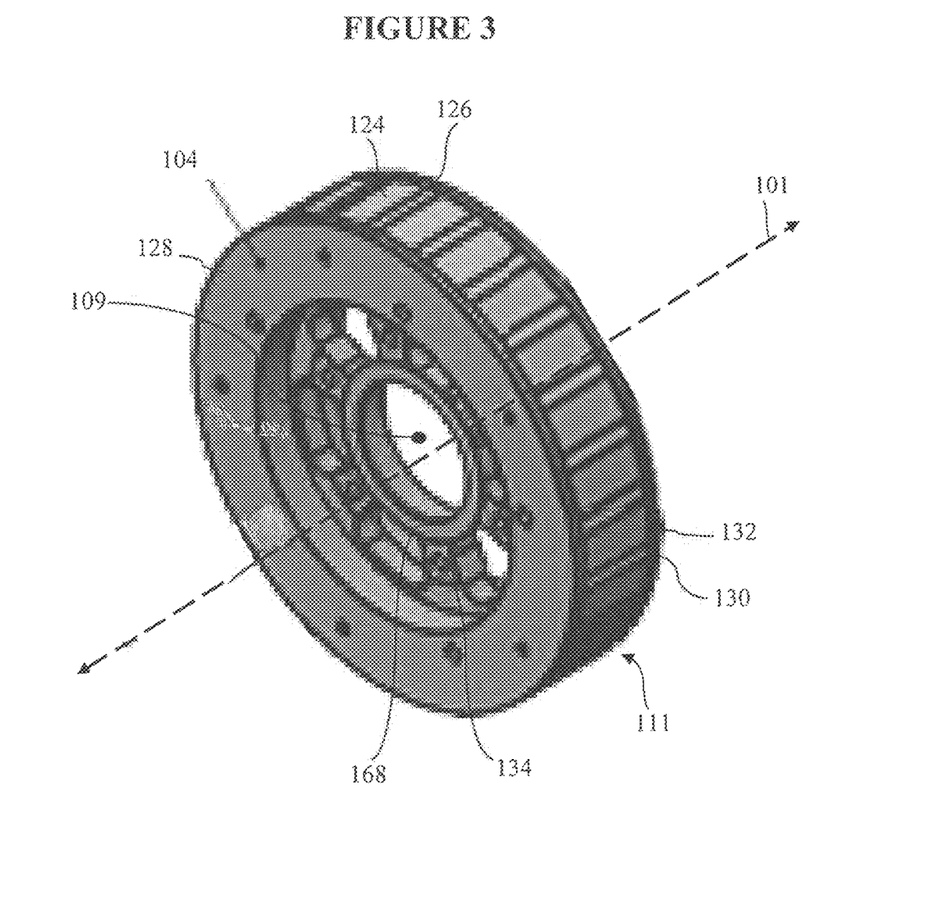
FIG. 3 is an enlarged view of one of the portions shown in FIG. 2, namely, a cycloid.
Figure 4:
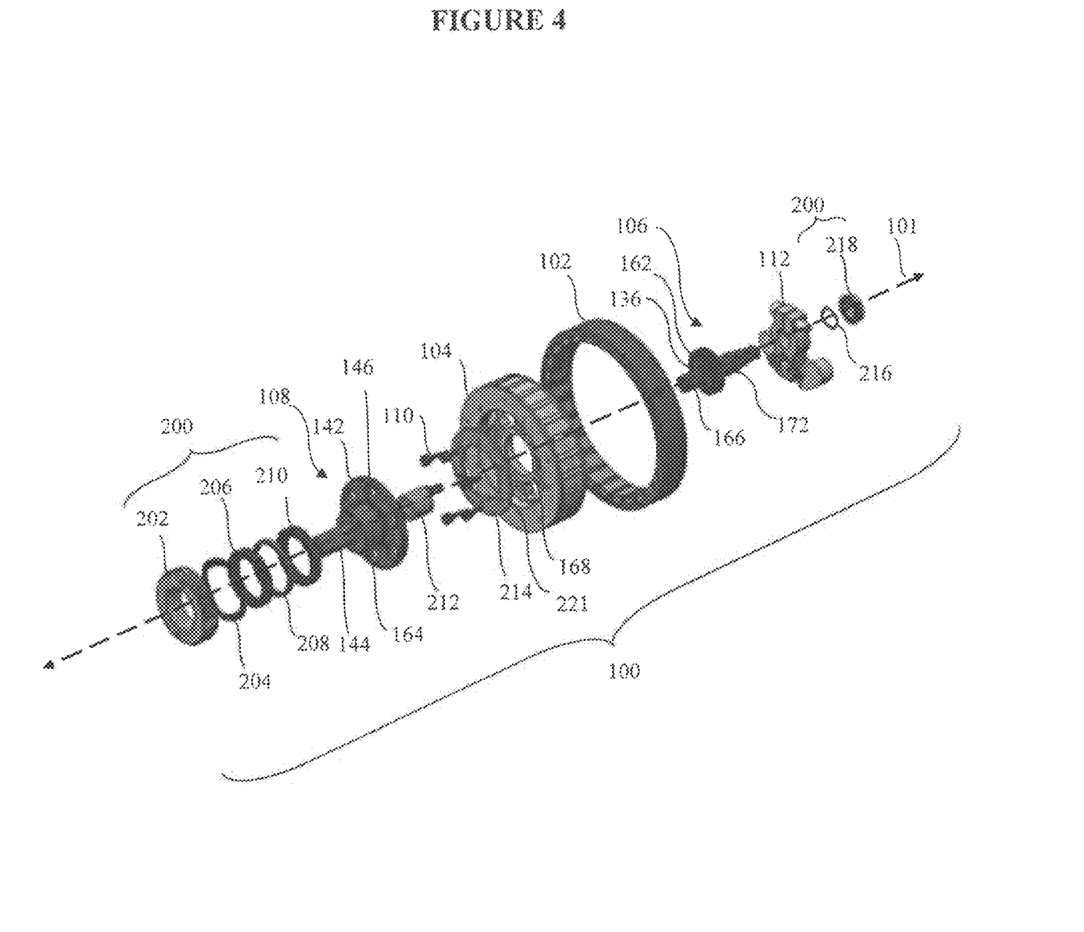
FIG. 4 is an exploded view of the magnetic cycloidal gear assembly that is the subject of FIG. 2, in which not only the portions of FIG. 2 but also mounting arrangement portions are shown, and in which the portions are exploded along a central axis of the gear assembly.

One example of a magnetic cycloidal gear assembly 100 of the present technology is shown in FIGS. 2, 3, and 4. The magnetic cycloidal gear assembly 100 is shown, in its entirety in an exploded manner, in FIG. 4. By contrast, portions 190 of the magnetic cycloidal gear assembly 100 are shown in FIG. 2, and particularly a cycloid 104 of that gear assembly is shown in FIG. 3.

As shown in FIG. 2, the portions 190 of the magnetic cycloidal gear assembly 100 include a stator 102, a cycloid 104, an input shaft 106, an output hub 108, a bushing 214, a plurality of cam followers 110, and a counterweight 112. The stator 102 is fixed and concentric with respect to a schematic primary axis 101 of the magnetic cycloidal gear assembly 100, such that the schematic primary axis 101 intersects a center point 103 of the stator 102 when the magnetic cycloidal gear assembly 100 is assembled and mounted. The stator 102 is generally annular in shape and has an outer cylindrical surface 105 and an inner cylindrical surface 107. The stator 102 includes a first number of magnetic pole pairs, such as m (or alternatively m+1) magnetic pole pairs, with each magnetic pole pair having a positive pole 114 and a negative pole 116.

In the present example, the stator 102 includes a back-iron cylinder 118 having an outer rim that constitute the outer cylindrical surface 105, and additionally a plurality of teeth (e.g., m teeth) 120 that each protrude radially inwardly from the back-iron cylinder towards the center point 103 of the stator 102. The stator 102 also has a number of (e.g., m) permanent magnets 122, with each of the permanent magnets 122 being mounted between a respective pair of the teeth 120 and facing inwardly towards the center point 103 of the stator 102. Innermost surfaces of the teeth 120 and of the permanent magnets together form the inner cylindrical surface 107 of the stator 102. In the present embodiment, each of the permanent magnets 122 is a respective one of the positive poles 114 of the stator 102, and each of the teeth 120 is a respective one of the negative poles 116. The respective teeth 120 also can be considered respective consequent poles by comparison with the respective permanent magnets 122.

The cycloid 104 serves as a rotor that is configured to rotate within the stator 102 during operation of the magnetic cycloidal gear assembly 100. The cycloid 104 is mounted eccentrically with respect to the schematic primary axis 101 of the magnetic cycloidal gear assembly 100, such that the schematic primary axis 101 does not intersect a center point (or center axis) 109 of the cycloid 104 when the magnetic cycloidal gear assembly 100 is assembled and mounted. The cycloid 104 can be mounted onto the input shaft 106 by a rolling element bearing 162 on an offset cam 136. The rolling element bearing 162 can be, in an example embodiment, a radial bearing. An outer cylindrical surface 111 of the cycloid 104 particularly is the surface that effectively rolls around the inner cylindrical surface 107 of the stator 102 (except insofar as an air gap separates the two surfaces) when the cycloid rotates during operation of the magnetic cycloidal gear assembly 100.

As particularly shown in FIG. 3, the cycloid 104 has a second number of magnetic pole pairs, such as n (or alternatively m) magnetic pole pairs, with each magnetic pole pair having a negative pole 124 and a positive pole 126. Because the cycloid 104 is configured to fit and rotate within the stator 102 during operation as the rotor of the magnetic cycloidal gear assembly 100, the number of magnetic pole pairs n of the cycloid is less than the number of magnetic pole pairs m of the stator 102. Depending upon the embodiment, the number of magnetic pole pairs n of the cycloid 104 can be less than the number of magnetic pole pairs m of the stator 102 by at least one magnetic pole pair, or by more than one magnetic pole pair.

In the present example embodiment, the cycloid 104 includes a back-iron cylinder 128 having a plurality of (e.g., n) teeth 130, and additionally includes a number of (e.g., n) permanent magnets 132, with each of the permanent magnets being mounted between a respective pair of the teeth. The permanent magnets 132 of the cycloid 104 are arranged to each face outwardly away from the center point 109, and also each of the teeth 130 extends radially outwardly from the back-iron cylinder 128, so as to extend in between a respective pair of the permanent magnets 132. Given this arrangement, it can be seen that the outer cylindrical surface 111 of the cycloid 104 is formed by the radially-outermost surfaces of the permanent magnets 132 and teeth 130. The polarities of the teeth 130 and permanent magnets 132 are opposite those of the teeth 120 and permanent magnets 122 of the stator 102. That is, each of the permanent magnets 132 of the cycloid 104 is a respective one of the negative poles 124, and each of the teeth 130 is a respective one of the positive poles 126. The respective teeth 130 also can be considered respective consequent poles by comparison with the respective permanent magnets 132.

Notwithstanding the above discussion, the stator 102 in other embodiments can have any other suitable arrangement that provides magnetic pole pairs. For example, a Halbach array can be used in place of back-iron. Also, the permanent magnets on the stator can be arranged to serve as negative poles (in terms of the polarity of the permanent magnets along the inner cylindrical surface 107), and the teeth in between those permanent magnets can serve as positive poles. Likewise, in other embodiments the cycloid 104 (or rotor) can have any other suitable arrangement that provides magnetic pole pairs. Additionally, the permanent magnets on the cycloid can be arranged to serve as positive poles (in terms of the polarity of the permanent magnets along the outer cylindrical surface 111). Further, in another embodiment, the teeth can be omitted and permanent magnets can serve as both positive and negative poles on one or both of the stator and rotor. Also, depending upon the embodiment, the rotor and stator need not have the same arrangement (e.g., in terms of permanent magnets, teeth, or other features).

In the present embodiment, the cycloid 104 is caused to rotate as a result of rotation of the input shaft 106. As shown in FIGS. 2 and 4, the input shaft 106 includes the offset cam 136, which is positioned within and supports the cycloid 104 by way of the rolling element bearing 162. In general, the input shaft 106 is concentric with respect to the schematic primary axis 101 of the magnetic cycloidal gear assembly 100. However, the offset cam 136 is offset with respect to the schematic primary axis 101 of the of the magnetic cycloidal gear assembly 100, with one side of the offset cam 136 extending outwardly from the input shaft 106 farther than the other side of the offset cam. In the present example embodiment, in which the offset cam 136 is circular, the offset cam 136 is concentric with the cycloid 104.

In addition to being caused to rotate as a result of rotation of the input shaft 106, the cycloid 104 and magnetic cycloidal gear assembly 100 more generally are configured so that rotation of the cycloid 104 additionally causes rotation of the output hub 108. In this regard, the cycloid 104 includes a plurality of cam follower retainers 134, each of which is configured to receive a respective one of the cam followers 110. Each of the plurality of cam followers 110 has a first end 138 and a second end 140. The second end of each of the plurality of cam followers 110 is retained by a respective one of the cam follower retainers 134, and is thus fixed to the cycloid 104. Further, the output hub 108 presses against the bushing 214, which can be an oil impregnated bushing, and the bushing can also press against the cycloid 104. The bushing 214 can include a plurality of bores 221 (see FIG. 4), and each of the plurality of cam followers 110 can pass through a respective one of the bores 221. The plurality of cam followers 110 can thus connect the bushing 214 to the cycloid 104.

It should be appreciated that the exact arrangement of the bushing 214, cam followers 110, and cam follower retainers 134 can vary depending upon the embodiment. For example, any suitable number of the cam follower retainers 134 and any suitable number of the bores 221 can be included, preferably at least two of each, or more than two of each, such as three, four, five, or more than five. For example, six of the cam follower retainers 134 and six of the bores 221 are illustrated in FIG. 4 as being present in the cycloid 104 and the bushing 214, respectively. Likewise, any suitable number of the cam followers 110 can be included in the magnetic cycloidal gear assembly 100. Accordingly, at least two of the cam followers 110 can be provided, or more than two, such as three, four, five, or more than five. For example, six of the cam followers 110 are illustrated in FIGS. 2 and 4. Preferably a respective one of the cam followers 110 is provided for each of cam follower retainers 134 of the cycloid 104.

The cam followers 110 particularly allow for rotational motion of the cycloid 104 to be communicated to the output hub 108, which is concentric with the schematic primary axis 101 of the magnetic cycloidal gear assembly 100. The output hub 108 includes an output disk 142, an output shaft 144, and an intermediate portion 164 positioned between the output shaft and output disk and having a diameter that is larger than that of the output shaft. The output shaft 144 can be connected to another device, and be used to transmit the speed and torque output (or generated) by the magnetic cycloidal gear assembly 100 to another device (not shown). The output disk 142 includes a plurality of cam follower receivers 146. Each of the cam follower receivers 146 has a receiver radius (or diameter) that is larger than a first end radius (or diameter) of each of the first ends 138 of each of the cam followers 110. By virtue of this difference in size of the receiver radius and first end radius, the first ends 138 of each of the cam followers 110 can rotate eccentrically within the respective ones of the cam follower receivers 146 even though the output hub 108 and cam follower receivers 146 thereof do not vary in their radial positioning relative to the schematic primary axis 101.

From the above discussion, it should be appreciated that the output hub 108 is interactively connected to the cycloid 104 by the cam followers 110, and the cam followers 110 transmit output torque and rotation from the cycloid 104 to the output hub. That is, as the cycloid 104 rotates relative to the stator 102, rotational power is transferred from the cycloid 104 to the output hub 108 by way of the plurality of cam followers 110 and their interactions with the cam follower receivers 146. The use of the plurality of cam followers 110 can eliminate the need for rolling pin elements, and can significantly reduce the rolling resistance and therefore improve the efficiency of the magnetic cycloidal gear assembly 100 as compared to some conventional magnetic cycloidal gear assemblies.

Additionally, oil (or other lubricant) can be delivered to the bores 221, and thereby to the cam followers 110, the cam follower receivers 146, and the interface between output hub 108 and the bushing 218 to facilitate relative movement of these component parts (and especially any sliding movement of the bushing relative to the output hub). In some embodiments, also encompassed herein, each of the cam followers 110 can include a respective roller bearing (or similar rolling head or wheel feature) at the respective first end 138 of the respective cam follower, as a respective head of the respective cam follower. With such an arrangement, movement of the cam followers 110 within the cam follower receivers 146 entails rotational motion of the roller bearings relative to the remaining portions of the cam followers (e.g., the second ends 140), and sliding motion (and consequent friction) of the cam followers relative to the cam follower receivers is lessened or avoided.

As for the counterweight 112, as shown in FIG. 2, the counterweight is attached to the input shaft 106. The counterweight 112 can have a clamp 148, a first lobe 150 and a second lobe 152. The clamp 148 can attach the counterweight 112 to the input shaft 106 such that the counterweight 112 can rotate with the input shaft 106. The counterweight 112 can balance out the mass imbalance caused by the rotation of the eccentrically mounted cycloid 104. To facilitate proper balancing of the magnetic cycloidal gear assembly 100, the counterweight 112 can be adjustable, as further described with reference to FIGS. 9A-9C below.

Referring more particularly to FIG. 4, in accordance with the present embodiment, the magnetic cycloidal gear assembly 100 additionally includes portions that constitute or serve as a mounting arrangement 200. In the present embodiment, the portions that constitute the mounting arrangement 200 include, from left to right axially with respect to the primary axis 101, an adjustable threaded nut 202, an output side wave spring 204, a first output side bearing 206, a spacer 208, a second output side bearing 210, a first input shaft bearing 212, a bushing 214, an input side wave spring 216, and a second input shaft bearing 218.

As discussed above, conventional magnetic cycloidal gear assemblies are often subject to wobble, particularly if tolerances are not met in machining and assembly. The large forces that are on the magnets during operation of such conventional gear assemblies can produce off-axis operation that can be significantly detrimental to the performance of the magnetic cycloidal gear assemblies. As with such conventional magnetic cycloidal gear assemblies, the cycloid 104 of the magnetic cycloidal gear assembly 100 of the present embodiment can be subject to high forces. Further, the cycloid 104 is mounted on the offset cam 136 of the input shaft 106 by the rolling element bearing 162, but is otherwise free-floating. Nevertheless, in contrast to such conventional magnetic cycloidal gear assemblies, the magnetic cycloidal gear assembly 100 of the present embodiment includes the mounting arrangement 200. The mounting arrangement 200, in combination with other features or portions of the magnetic cycloidal gear assembly 100, reduces or prevents wobble or off-axis operation to allow for stable operation.

Figure 5:
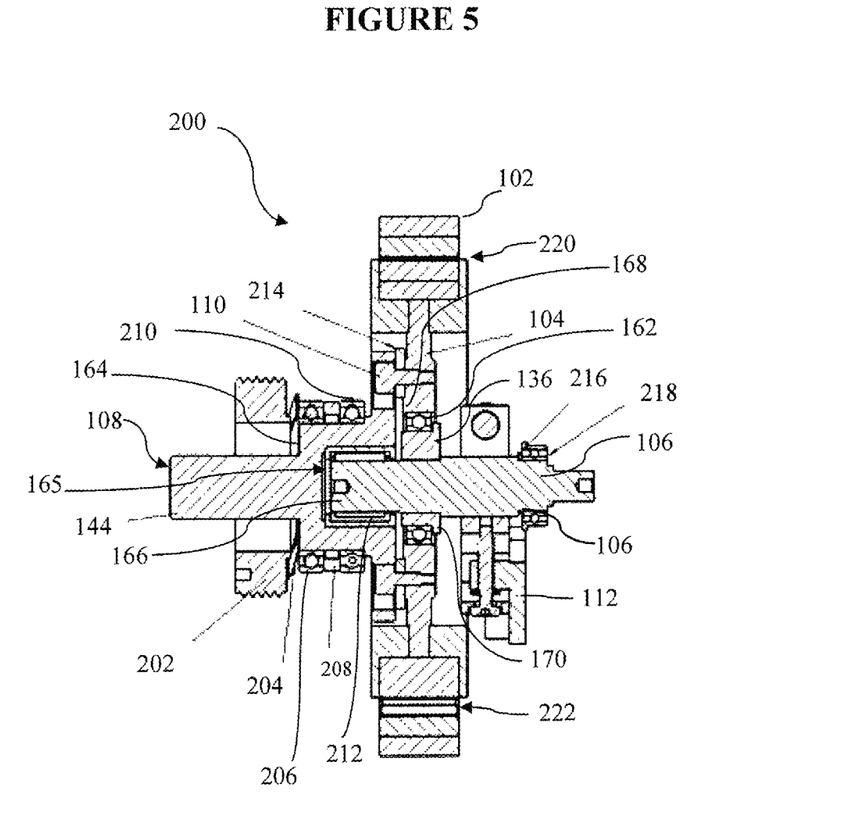
FIG. 5 is a cross-sectional view of the magnetic cycloidal gear assembly FIG. 4, when the portions of the magnetic cycloidal gear assembly are fully assembled (rather than exploded) and have first rotational positions about the central axis corresponding to the positions shown in FIG. 4.

Further in this regard, FIG. 5 provides a cross-sectional view of the magnetic cycloidal gear assembly 100 when fully assembled. The particular cross-sectional view provided in FIG. 5 is taken along a plane that passes through the schematic primary axis 101. FIG. 5 particularly illustrates how the mounting arrangement 200 and other features or portions of the magnetic cycloidal gear assembly 100 are structured and arranged, which allows adjustment of the assembly to stabilize its operation.

Figure 10:
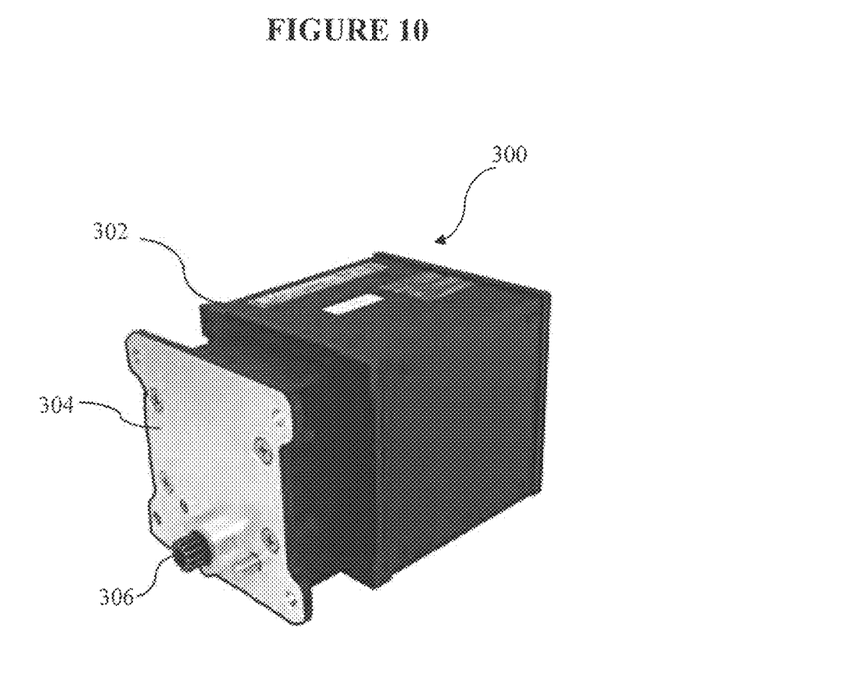
FIG. 10 is a perspective view of a housing for a magnetic cycloidal gear assembly of the present technology.

To begin, FIG. 5 illustrates how the input shaft 106 and output hub 108 are supported relative to one another and relative to external structures (e.g., as shown in FIG. 10). In the present embodiment, an input shaft receiver 165 (which defines an input shaft receiving orifice) is provided within the output hub 108 and particularly extends inwardly from the end surface of the output disk 142 and into the intermediate portion 164, toward (but not up to) the output shaft 144. The input shaft receiver 165 is configured to receive a first end 166 of the input shaft 106 as well as the first input shaft bearing 212. More particularly, the first input shaft bearing 212 can be inserted into the input shaft receiver 165, and the first end 166 of the input shaft 106 can be inserted into the first input shaft bearing. The first input shaft bearing 212 can be a roller bearing, and can prevent radial movement of the input shaft 106 while allowing the input shaft 106 to rotate within the input shaft receiver 165. Therefore, the input shaft 106 (at least the first end 166 of the input shaft) is rotatably supported upon and within the output hub 108 by way of the first input shaft bearing 212.

Additionally, the input shaft 106 is supported at or near its opposite end, opposite the first end 166, by way of the second input shaft bearing 218. It should be appreciated that the second input shaft bearing 218 in turn will be supported in relation to another support structure (not shown), which can be considered to be distinct from the magnetic cycloidal gear assembly 100. The input shaft 106 also includes a second end shoulder 172. The input side wave spring 216 can be mounted on or against the second end shoulder 172 of the input shaft 106, and can be retained on the input shaft 106 by the second input shaft bearing 218.

Further, with respect to the output hub 108, the intermediate portion 164 (in terms of its outer diameter) also effectively forms a shoulder on the outside of the output hub that extends from the output disk 142 to the output shaft 144. The first output side bearing 206, spacer 208, and second output side bearing 210 can be provided to span the length of the shoulder formed by the intermediate portion 164. More particularly, the second output side bearing 210 is positioned closer to the output disk 142 (in the present example embodiment, the second output side bearing 210 abuts a shoulder alongside the output disk), the first output side bearing 206 is positioned closer to the output shaft 144, and the spacer 208 is positioned therebetween. It should be appreciated that the first and second output side bearings 206 and 210 in turn will be supported in relation to other support structure(s) (not shown), which can be considered to be distinct from the magnetic cycloidal gear assembly 100.

With the first output side bearing 206, spacer 208, and second output side bearing 210 positioned in this manner in relation to the intermediate portion 164, the output side wave spring 204 can be further positioned onto the output shaft 144 so as to abut the first output side bearing 206 (opposite the side of that bearing which is in contact with the spacer 208). Additionally, the adjustable threaded nut 202 can be positioned onto the output shaft 144 against the output side wave spring 204, so as to compress the output side wave spring onto the output hub 108 against the intermediate portion 164 and the first output side bearing 206. Thus, the adjustable threaded nut 202 can provide support for the output side wave spring 204 and cause axial force to be transferred from an outer edge of the output side wave spring 204 to the output disk 142. Such axial force can in turn be communicated by the output disk 142 to the bushing 214, which in turn can be applied by the bushing to the cycloid 104. In alternate embodiments, a different tightenable or otherwise adjustable force application component can be employed in place of, or in addition to, the adjustable threaded nut 202.

In addition to showing how the input shaft 106 and output hub 108 relative to one another and relative to external structures (e.g., as shown in FIG. 10), FIG. 5 additionally illustrates how these components cooperate with other features of the magnetic cycloid gear assembly 100 to achieve an overall system that can operate in a stable manner despite the high forces experienced by the cycloid 104 during operation. In particular, FIG. 5 shows that the cycloid 104 can include a cycloid lip (or shoulder) 168, and can be mounted on the rolling element bearing 162 in part by way of the cycloid lip 168. As illustrated, the cycloid lip particularly extends radially inwardly along a side portion of the rolling element bearing 162, along the side of the rolling element bearing that is closer to (rather than farther from), the output hub 108. Given this arrangement, the cycloid lip 168 can provide an axial reaction to the axial force on the cycloid 104 imparted by the bushing 214.

Further, through a series of additional shoulders, the axial force imparted by the cycloid lip 168 upon the rolling element bearing 162 can be imparted to (or reacted through) the second input shaft bearing 218. In particular, in the present embodiment, the offset cam 136 includes an offset cam shoulder 170 that extends radially outward from the offset cam alongside the rolling element bearing 162, on the side of the rolling element bearing that is farther from (rather than closer to) the output hub 108. Accordingly, axial force imparted by the cycloid lip 168 can in turn be communicated through the rolling element bearing 162 to the offset cam 136 via the offset cam shoulder 170. Additionally, because the offset cam 136 abuts a further shoulder 171 formed on the input shaft 106, the axial force communicated to the offset cam 136 is further transmitted via the input shaft to the second input shaft bearing 218 by way of the second end shoulder 172 and input side wave spring 216 positioned between that second end shoulder and that second input shaft bearing.

Thus, it should be appreciated that the cycloid 104 is axially held in place and stabilized by counteracting forces on opposite sides of the cycloid. That is, on one side, the axial forces provided by adjustable threaded nut 202 and output side wave spring 204 are applied to one side of the cycloid 104 by way of the first and second output side bearings 206 and 210 and the spacer 208, the output hub 108 and output disk 142 thereof, and the bushing 214. Further, on the other side, opposed axial forces provided by the second input shaft bearing 218 and input side wave spring 216 are applied to the other side of the cycloid 104 by way of the second end shoulder 172, the input shaft 106, the further shoulder 171, the offset cam 136 and offset cam shoulder 170 thereof, the rolling element bearing 162, and the cycloid lip 168. Further, varying pressure can be applied to the cycloid 104 by adjusting the adjustable threaded nut 202. The adjustable threaded nut 202 can thus allow the stabilizing force to be tuned very precisely, depending on the stack-up of the assembly and the precise operational envelope of the unit.

Figure 6:
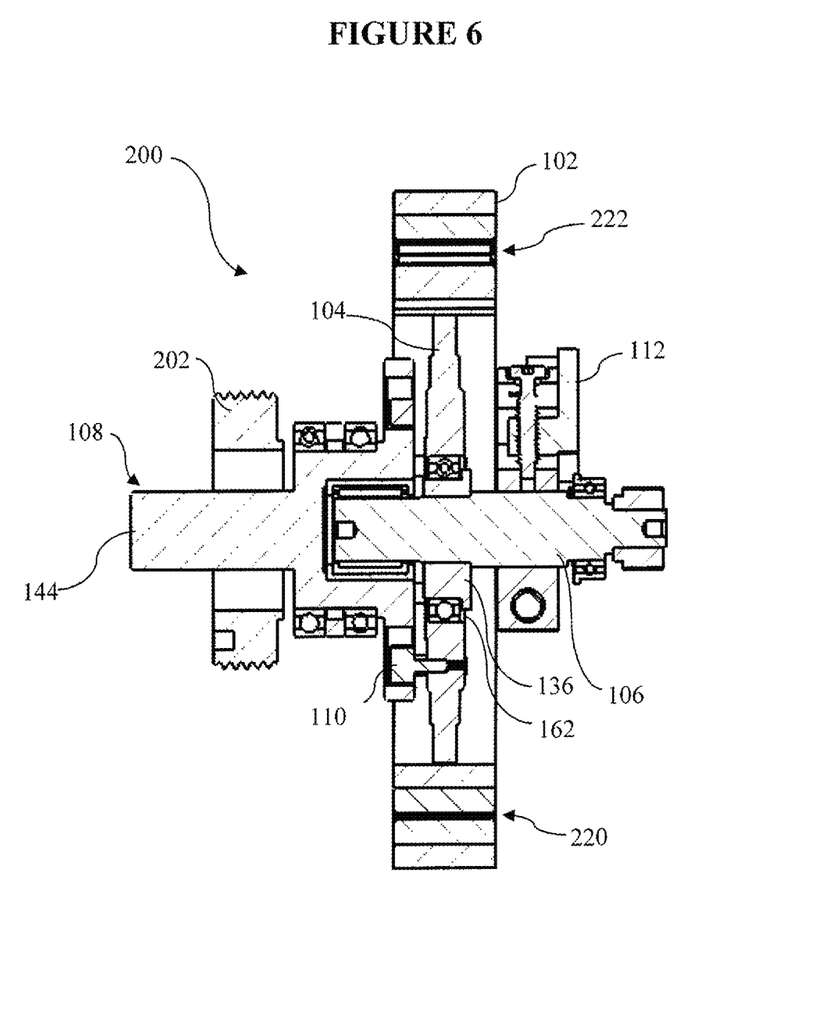
FIG. 6 is cross-sectional view of the magnetic cycloidal gear assembly FIG. 4, when the portions of the magnetic cycloidal gear assembly are fully assembled (rather than exploded) but have rotational positions about the central axis differing from those shown in FIG. 4 and FIG. 5.
Figure 7:
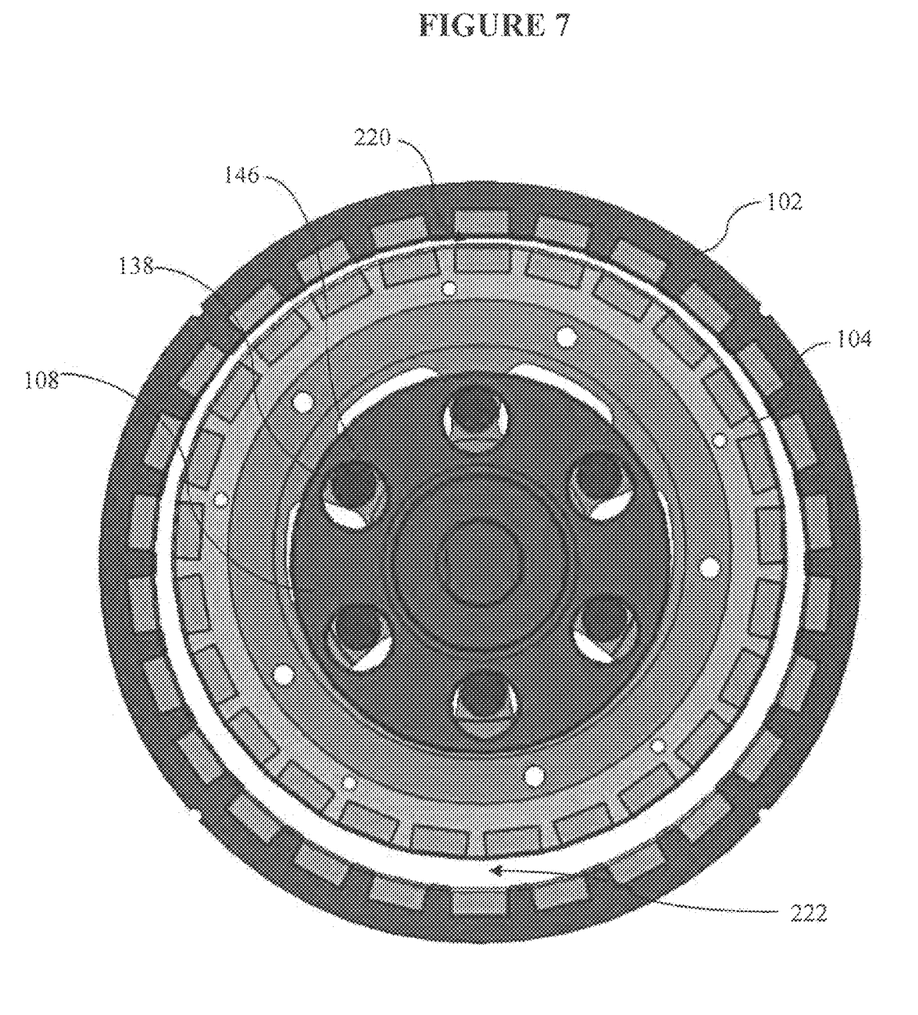
FIG. 7 is a front elevation view of the magnetic cycloidal gear assembly of FIG. 4, with the portions of the magnetic cycloidal gear assembly having the first rotational positions as shown in FIG. 5.
Figure 8:
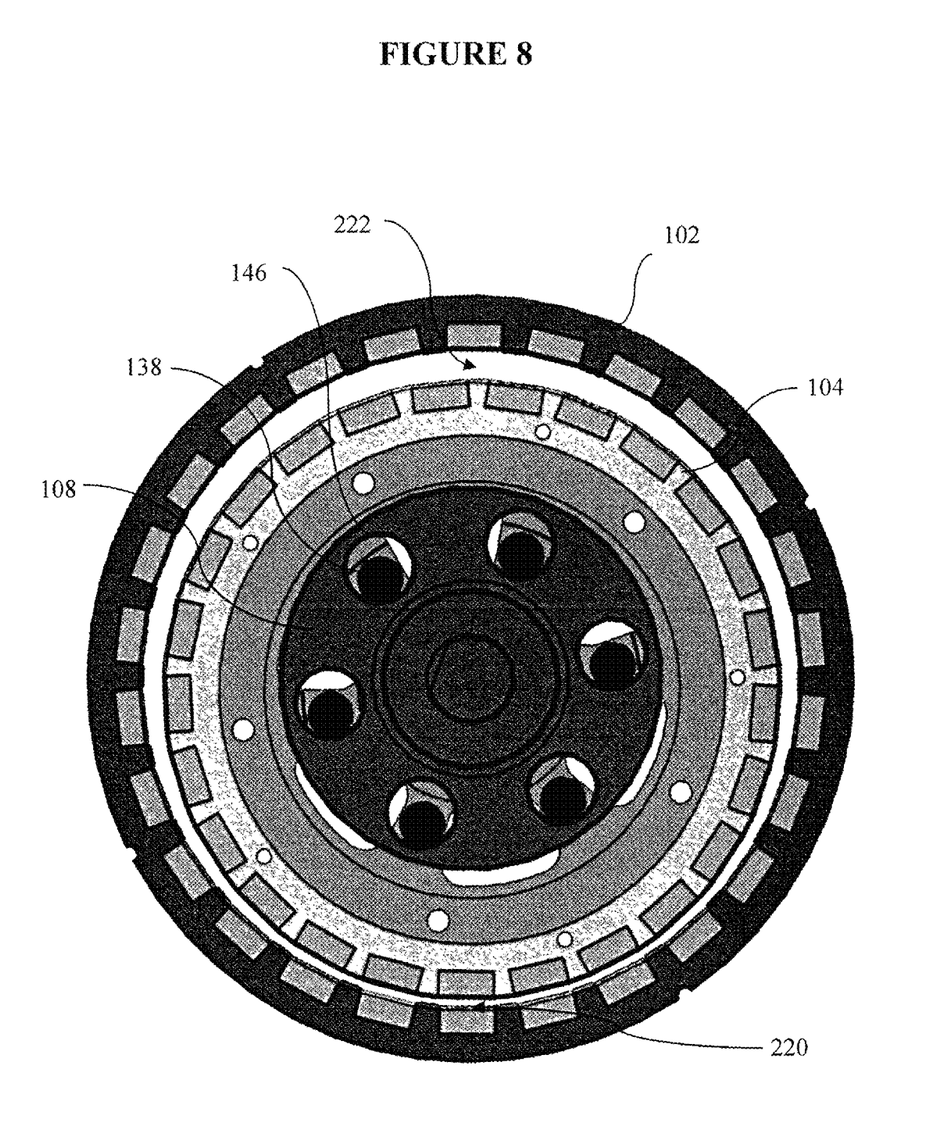
FIG. 8 is a front elevation view of the magnetic cycloidal gear assembly of FIG. 4, with the portions of the magnetic cycloidal gear assembly having the second rotational positions as shown in FIG. 6.

FIG. 5, and additionally FIGS. 6, 7, and 8, further illustrate the magnetic cycloidal gear assembly 100 including the mounting arrangement 200 at different times during operation, at which the cycloid 104 has two different positions relative to the stator 102. FIGS. 5 and 7 particularly provide cross-sectional and front elevation views, respectively, of the magnetic cycloidal gear assembly 100 when the cycloid 104 is in a first position, which corresponds to what is shown in FIG. 4 (in terms of the rotational orientation of the cycloid 104 about the schematic primary axis 101). By contrast, FIGS. 6 and 8 provide cross-sectional and front elevation views, respectively, of the magnetic cycloidal gear assembly 100 when the cycloid 104 is in a different, second position. Thus, the rotation of the magnetic cycloidal gear assembly 100 (as mounted by way of the mounting arrangement 200) can be seen by comparing FIGS. 5 and 7 with FIGS. 6 and 8. Additionally it should be appreciated that, FIGS. 5, 6, 7, and 8 also show corresponding different positions of other components or portions of the magnetic cycloidal gear assembly 100 that also vary in their positions when the cycloid varies in its rotational positioning.

As will be appreciated from the above discussion, movement of the cycloid 104 results from rotation of the input shaft 106 and offset cam 136, which causes different ones of the positive poles 114 and negative poles 116 of the stator 102 to come into proximity with different ones of the negative poles 124 and positive poles 126 of the cycloid 104. Due to the interactions between these pole pairs, slipping motion between the outer cylindrical surface 111 of the cycloid 104 and the inner cylindrical surface 107 of the stator 102 is prevented. Consequently, as governed by the interaction of the magnetic pole pairs on the cycloid 104 and stator 102, rotation of the input shaft 106 and offset cam 136 causes the outer cylindrical surface of the cycloid 104 to "roll along" the inner circular surface 107 of the stator 102 (with those surfaces only being separated by an air gap), in an eccentric manner.

The first position of FIGS. 5 and 7 shows the magnetic cycloidal gear assembly 100 at the start of a 360° revolution of the input shaft 106 (and offset cam 136), when the position of the cycloid 104 is closest to the uppermost portion of the inner cylindrical surface 107 of the stator 102. By comparison, the second position of FIGS. 6 and 8 is half way through the revolution of the input shaft 106, at 180° from the first position, when the position of the cycloid 104 is closest to the lowermost portion of the inner cylindrical surface 107 of the stator 102.

Because the cycloid 104 is supported upon the offset cam 136 and rotates eccentrically within the stator 102, and given the magnetic interactions between the cycloid 104 and stator 102, the amount of air gap (or space) between the stator 102 and the cycloid 104 varies at any given point around the inner circumference of the stator 102 as the cycloid 104 rotates. Nevertheless, there is always a minimum gap 220 between the stator 102 and the cycloid 104 at a first point and a maximum gap 222 at a second point, and the locations of those points rotate as the cycloid 104 rotates in response to rotation of the input shaft 106 and offset cam 136.

For example, as can be seen with reference to FIGS. 5 and 7, when the cycloid 104 is in the first position, the minimum gap 220 between the stator 102 and the cycloid 104 is at the top (as illustrated in FIGS. 5 and 7) of the stator 102 and the cycloid 104, then the maximum gap 222 is at the bottom of the stator 102 and the cycloid 104. In contrast, as can be seen with reference to FIGS. 6 and 8, when the cycloid 104 in the second position, the minimum gap 220 between the stator 102 and the cycloid 104 is at the bottom (as illustrated in FIGS. 6 and 8) of the stator 102 and the cycloid 104, while the maximum gap 222 is schematically at the top of the stator 102 and the cycloid 104.

FIGS. 5, 6, 7, and 8 additionally show how other components or portions of the magnetic cycloidal gear assembly 100 rotate or otherwise move in conjunction with rotation of the input shaft 106 and offset cam 136 and consequent movement of the cycloid 104. In particular, FIG. 7 shows that, when the cycloid 104 is in the first position, each of the first ends 138 of the respective cam followers 110 is at the respective top of the respective cam follower receiver 146 into which the respective first end is positioned. In contrast, FIG. 8 shows that, when the cycloid 104 is in the second position, each of the first ends 138 of the respective cam followers 110 is at the respective bottom of the respective cam follower receiver 146 into which the respective first end is positioned. Thus, the eccentric rotation of the cam followers 110 within the cam follower receivers 146 that accompanies the eccentric rotation of the cycloid 104 can be appreciated from FIGS. 7 and 8.

Additionally, FIGS. 5 and 6 illustrate that the counterweight 112 takes on different rotational positions (e.g., about the schematic primary axis 101) as the input shaft 106 and offset cam 136 rotate and correspondingly the cycloid 104 takes on different positions such as the first and second positions mentioned above. With reference to FIG. 5, when the cycloid 104 is in the first position, the counterweight 112 is directed downwardly from the input shaft 106—that is, lobes or weighted portions of the counterweight 112 are positioned beneath the input shaft. In contrast, with reference to FIG. 6, when the cycloid 104 is in the second position, the counterweight 112 is directed upwardly from the input shaft 106—that is, lobes or weighted portions of the counterweight 112 are positioned above the input shaft.

Figure 9A:
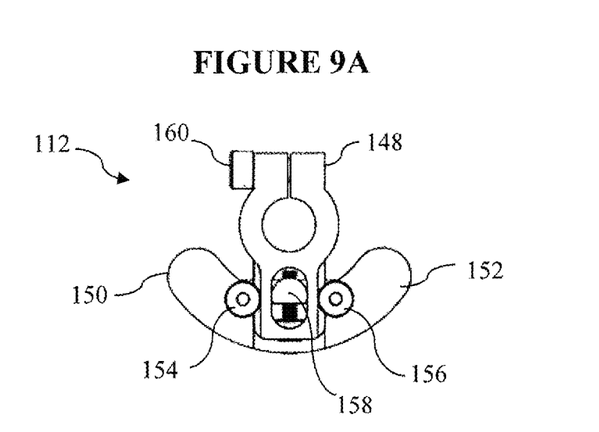
FIG. 9A is a front elevation view of an adjustable counterweight of the present technology.
Figure 9B:
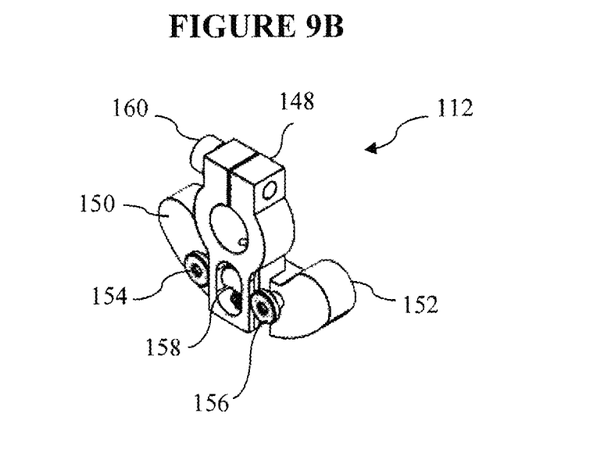
FIG. 9B is a perspective view of the adjustable counterweight of FIG. 9A.
Figure 9C:
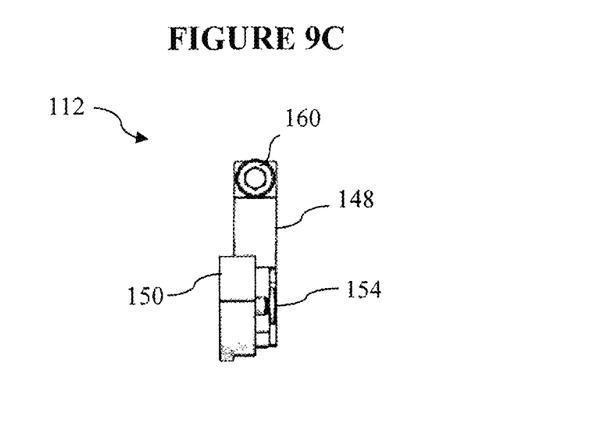
FIG. 9C is a side elevational view of the adjustable counterweight of FIG. 9A.

Further with respect to the counterweight 112, FIGS. 9A-9C illustrate in further detail example features of the counterweight 112 that can be used in magnetic cycloidal gear assemblies of the present technology such as the magnetic cycloidal gear assembly 100. In the present embodiment, the counterweight 112 can be adjustable, and can allow for minute adjustments to be made to achieve a variety of weighting or balancing characteristics that are particularly suited for desired operation of the magnetic cycloidal gear assembly. Indeed, the counterweight 112 is adjustable such that the counterweight can be implemented in any of a variety of different magnetic cycloid gear assemblies and such that each unit (e.g., any given gear assembly in which the counterweight is implemented) can be balanced individually, according to the details or particular characteristics of that unit. In addition, the units can be tuned such that the critical speeds are well outside the envelope of operation.

The counterweight 112 can have a clamp 148, a first lobe 150 and a second lobe 152. The clamp 148 can include a tightener 160 that can be loosened and tightened to permit attachment and detachment of the counterweight 112 in relation to the input shaft 106. The first lobe 150 can be on a first side of the clamp 148 and the second lobe 152 can be on a second side of the clamp 148. The counterweight 112 can also include, depending upon the embodiment, one or more adjusters that permit adjustment of the position(s) of the first lobe 150, the second lobe 152, or both lobes, with respect to the clamp 148.

For example (as shown in FIGS. 9A, 9B, and 9C), the first lobe 150 can include a first adjuster 154, which can be configured to adjust the position of the first lobe 150 in at least a first direction, such as forward and backward with respect to the clamp 148 (e.g., axially forward or backward in directions parallel to the schematic primary axis 101 of FIGS. 2 and 4 when the counterweight is mounted on the input shaft 106). Additionally, the second lobe 152 can include a second adjuster 156, which can be configured to adjust the position of the second lobe 152 in at least a first direction, such as forward and backward with respect to the clamp 148 (e.g., axially forward or backward in directions parallel to the schematic primary axis 101 of FIGS. 2 and 4 when the counterweight is mounted on the input shaft 106). The counterweight 112 can also include a vertical adjuster 158, which can adjust the vertical position of both the first lobe 150 and the second lobe 152 with respect to the clamp, causing the first and second lobes to be raised or lowered (e.g., moved radially inward or outward relative to the schematic primary axis 101 of FIGS. 2 and 4 when the counterweight is mounted on the input shaft 106).

Magnetic cycloid gear assemblies of the present technology can be supported or implemented within any of a variety of types of structures depending upon the embodiment, and can be employed in any of a variety of applications. Referring to FIG. 10, in one example embodiment, the magnetic cycloidal gear assembly 100 can be contained within a housing 300. As shown, the housing 300 includes an outer shell 302 that encloses the magnetic cycloidal gear assembly 100. The housing 300 can also include a front cover 304, which can be a removable access panel that, when removed, provides access to the inside of the housing 300 and the magnetic cycloidal gear assembly 100. Internally within the housing 300, additional support structures (not shown) can be provided to support the first output side bearing 206, the second output side bearing 210, and the second input shaft bearing 218, so as to support the magnetic cycloidal gear assembly 100 within the housing 300.

The housing 300 can also include a connector 306, which engages and connects at a first end to the output shaft 144 of the output hub 108 and at a second end to another device to transfer rotational power from the magnetic cycloidal gear assembly 100 to the other device, which can be external to the housing. If the input shaft 106 is also driven by a rotational power source external to the housing, a further connector (not shown) can also be provided to couple the input shaft with that rotational power source. It should be appreciated that, although for purposes of the above discussion the magnetic cycloidal gear assembly 100 is considered to be distinct from, and situated within, the housing 300, nevertheless the magnetic cycloidal gear assembly can also be understood to include the housing.

One or more of the embodiments encompassed herein can be advantageous in any of a variety of respects. For example magnetic gear assemblies of the present technology have advantages over mechanical gear assemblies, including for example, being able to apply pressure no matter the relative angle, not incurring wear from mating surfaces, reduced noise, and being able to slip without damage. Additionally, magnetic gear assemblies of the present technology can provide the potential for zero-backlash and high ratio gear reduction in small physical envelope. Magnetic gear assemblies of the present technology generally are not subject to overloading, since the magnets will slip if the torque-carrying capacity is exceeded. Further, magnetic gear assemblies of the present technology can have improved balance and stability as compared to many conventional magnetic gear assemblies. Such advantages can result in improved life and reliability of the magnetic gear assemblies.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A magnetic cycloidal gear assembly comprising:
a stator that is fixed and concentric with respect to a primary axis of the magnetic cycloidal gear assembly, wherein the stator has a first number of magnetic pole pairs;
an input shaft that is configured to rotate about the primary axis and that includes an offset cam that is offset with respect to the primary axis,
a cycloid mounted at least indirectly upon the offset cam and configured to rotate both relative to the offset cam and also within the stator, wherein the cycloid is eccentric with respect to the primary axis, and wherein the cycloid includes a second number of magnetic pole pairs and a plurality of cam follower retainers;
an output hub that is concentric with the primary axis and includes a plurality of cam follower receivers;
a plurality of cam followers, each cam follower having a respective first end and a respective second end, wherein the respective first end of each cam follower is received within a respective one of the cam follower receivers and the respective second end of each cam follower is retained by a respective one of the cam follower retainers; and
an adjustable counterweight attached to the input shaft.

2. The magnetic cycloidal gear assembly of claim 1, wherein the stator includes:
a back-iron cylinder having a plurality of teeth, each of the teeth forming a first polarity pole of one of the first number of magnetic pole pairs; and
a plurality of permanent magnets, each of the permanent magnets being mounted between a respective pair of the back-iron teeth and forming a second polarity pole of one of the first number of magnetic pole pairs.

3. The magnetic cycloidal gear assembly of claim 1, wherein the cycloid is rotatably mounted on the offset cam by way of a rolling element bearing, and wherein the cycloid includes:
a back-iron cylinder having a plurality of teeth, each of the teeth forming a first polarity pole of one of the second number of magnetic pole pairs; and
a plurality of permanent magnets, each of the permanent magnets being mounted between a respective pair of the back-iron teeth and forming a second polarity pole of one of the second number of magnetic pole pairs.

4. The magnetic cycloidal gear assembly of claim 1, wherein the counterweight includes a clamp, a first lobe, and a second lobe.

5. The magnetic cycloidal gear assembly of claim 4, wherein the counterweight further includes at least one adjuster that adjusts the position of at least one of the first lobe and the second lobe with respect to the clamp.

6. The magnetic cycloidal gear assembly of claim 1, further comprising a housing including an outer shell, a front cover that is removable to provide access to an inside of the housing, and a connector that connects at a first end to the output hub.

7. A magnetic cycloidal gear assembly comprising:
a stator that is fixed and concentric with respect to a primary axis of the magnetic cycloidal gear assembly, wherein the stator has a first number of magnetic pole pairs;
an input shaft that is configured to rotate about the primary axis and that includes an offset cam that is offset with respect to the primary axis, and a rolling element bearing on the offset cam;
a cycloid mounted on the rolling element bearing and configured to rotate both relative to the offset cam and also within the stator, wherein the cycloid is eccentric with respect to the primary axis, and wherein the cycloid includes a second number of magnetic pole pairs and a plurality of cam follower retainers;
an output hub that is concentric with the primary axis and includes a plurality of cam follower receivers;
a plurality of cam followers, each cam follower having a respective first end and a respective second end, wherein the respective first end of each cam follower is received within a respective one of the cam follower receivers and the respective second end of each cam follower is retained by a respective one of the cam follower retainers; and
a mounting arrangement including
a first bearing provided along the input shaft, by which the input shaft can be at least partly supported;
a second bearing provided along the output hub, by which the output hub can be at least partly supported; and
an adjustable threaded nut that at least indirectly applies a first force, in a first axial direction parallel to the primary axis, upon the cycloid,
wherein either the first bearing or at least one additional structure at least indirectly applies a second force, in a second axial direction parallel to the primary axis but opposed to the first force, so as to balance the first force and increase an operational stability of the magnetic cycloidal gear assembly.

8. The magnetic cycloidal gear assembly of claim 7, wherein the mounting arrangement additionally includes an output side wave spring mounted on the output hub, wherein the adjustable threaded nut at least indirectly applies the first force by way of the output side wave spring.

9. The magnetic cycloidal gear assembly of claim 7, wherein the output hub comprises an output disk and an output shaft, and further comprises an intermediate portion that forms a shoulder that extends between the output disk and the output shaft, wherein the intermediate portion includes an input shaft receiver extending inwardly from the output disk into the intermediate portion.

10. The magnetic cycloidal gear assembly of claim 9, wherein the mounting arrangement further comprises a third bearing inserted into the input shaft receiver, wherein a first end of the input shaft is inserted into the third bearing.

11. The magnetic cycloidal gear assembly of claim 7, wherein the input shaft further comprises a first end and a second end, the second end including a second end shoulder, wherein the mounting arrangement further comprises an input side wave spring, and wherein the first bearing is positioned adjacent to the second end shoulder.

12. The magnetic cycloidal gear assembly of claim 7, further comprising a bushing, wherein the output hub presses against the bushing and the bushing presses against the cycloid.

13. The magnetic cycloidal gear assembly of claim 12, wherein the bushing is an oil impregnated bushing, wherein the bushing includes a plurality of bores, and wherein each of the plurality of cam followers passes through a respective one of the bores.

14. The magnetic cycloidal gear assembly of claim 13, wherein the mounting arrangement additionally includes a third bearing and a spacer both arranged along the output hub, wherein the spacer is positioned between the second and third bearings.

15. The magnetic cycloidal gear assembly of claim 7, wherein the cycloid further comprises a cycloid shoulder, and the cycloid is mounted on the rolling element bearing by the cycloid shoulder,     wherein the second force is imparted from the first bearing, via the input shaft to the offset cam, via the offset cam to the rolling element bearing, and from the rolling element bearing to the cycloid by way of the cycloid shoulder.

16. The magnetic cycloidal gear assembly of claim 7, wherein the stator includes:

a back-iron cylinder having a plurality of teeth, each of the teeth forming a respective first polarity pole of a respective one of the first number of magnetic pole pairs; and     a plurality of permanent magnets, each of the permanent magnets being mounted between a respective pair of the back-iron teeth and forming a respective second polarity pole of a respective one of the first number of magnetic pole pairs.

17. The magnetic cycloidal gear assembly of claim 7, wherein the cycloid includes:

a back-iron cylinder having a plurality of teeth, each of the teeth forming a respective first polarity pole of a respective one of the second number of magnetic pole pairs; and     a plurality of permanent magnets, each of the permanent magnets being mounted between a respective pair of the back-iron teeth and forming a respective second polarity pole of a respective one of the second number of magnetic pole pairs.

18. The magnetic cycloidal gear assembly of claim 7, further comprising a counterweight that includes a clamp, a first lobe, and a second lobe, wherein the counterweight further includes at least one adjuster that adjusts the position of at least one of the first lobe and the second lobe with respect to the clamp.

19. The magnetic cycloidal gear assembly of claim 7, further comprising a housing including an outer shell, a front cover that is removable to provides access to an inside of the housing, and a connector that connects at a first end to the output hub.

20. A magnetic cycloidal gear assembly comprising:

a stator having an inner cylindrical surface concentric about a first axis, and a plurality of first permanent magnets arranged along the inner cylindrical surface;

a cycloid having an outer cylindrical surface concentric about a second axis of the cycloid, and a plurality of second permanent magnets arranged along the outer cylindrical surface;

an input shaft including an offset cam, wherein the cycloid is supported at least indirectly by the offset cam so that input rotation of the input shaft causes the second axis to rotate about the first axis and additionally, at least in part due to interactions between the first permanent magnets and the second permanent magnets, causes the outer cylindrical surface to rotate relative to the inner cylindrical surface;

an output hub at least indirectly coupled to the cycloid by way of a plurality of cam followers, wherein the respective cam followers extend from the cycloid into respective cam follower receivers formed in the output hub, so that the output hub is caused to rotate when the outer cylindrical surface rotates relative to the inner cylindrical surface;

a mounting arrangement including a plurality of bearings and an adjustable force application component, wherein the bearings are configured to provide support for the input shaft and the output hub; and     an adjustable counterweight configured to be mounted on the input shaft,     wherein the adjustable force application component and at least one of the bearings are configured to apply to the cycloid, at least indirectly, first and second forces parallel to the first axis but in opposed directions,     thereby, due to the mounting arrangement and the adjustable counterweight, enhanced balance and stability of operation of the magnetic cycloidal gear assembly are achieved.

\* \* \* \* \*